(12) United States Patent
Reed et al.

(10) Patent No.: US 6,965,412 B2
(45) Date of Patent: Nov. 15, 2005

(54) X-Y VIDEO CAMERA SUPPORT AND POSITIONING SYSTEM

(76) Inventors: Claude R. Reed, 3750 1st Ave., San Diego, CA (US) 92103; Richard C. Reed, 500 W. Harbor Dr., #715, San Diego, CA (US) 92101

( * ) Notice: Subject to any disclaimer, the term of this patent is extended or adjusted under 35 U.S.C. 154(b) by 778 days.

(21) Appl. No.: 10/029,710

(22) Filed: Dec. 19, 2001

(65) Prior Publication Data

US 2003/0112336 A1    Jun. 19, 2003

(51) Int. Cl.[7] ............................................. H04N 5/225
(52) U.S. Cl. ................................... 348/373; 348/311.7
(58) Field of Search .............................. 348/373, 375, 348/211.99, 211.1, 211.2, 211.4, 211.7, 211.8, 348/61, 62, 63

(56) References Cited

U.S. PATENT DOCUMENTS

| | | | |
|---|---|---|---|
| 4,115,813 A | * | 9/1978 | Mikami ........................ 348/63 |
| 4,187,051 A | * | 2/1980 | Kirsch et al. ............. 414/744.3 |
| 5,245,421 A | * | 9/1993 | Robertson et al. ........... 348/126 |
| 5,568,189 A | * | 10/1996 | Kneller ........................ 348/144 |
| 5,831,667 A | * | 11/1998 | Siminou ....................... 348/63 |
| 6,064,426 A | * | 5/2000 | Waterman ..................... 348/63 |
| 6,150,158 A | * | 11/2000 | Bhide et al. .............. 435/286.3 |
| 6,209,834 B1 | * | 4/2001 | Stonehouse .............. 248/274.1 |
| 6,731,326 B1 | * | 5/2004 | Bettinardi ..................... 348/63 |
| 6,788,806 B2 | * | 9/2004 | Kadomatsu et al. ........ 382/147 |

* cited by examiner

Primary Examiner—Wendy R. Garber
Assistant Examiner—Jacqueline Wilson
(74) Attorney, Agent, or Firm—Pillsbury Winthrop Shaw Pittman LLP

(57) ABSTRACT

An X-Y video camera support and positioning system for enhancing viewing for persons with poor vision. The system includes a positioning device that receives input from a four button control panel, which allows precise positioning of a video camera above a stage. The images from the video camera are output onto a monitor, where they are displayed. The system is low cost and extremely easy to use.

24 Claims, 4 Drawing Sheets

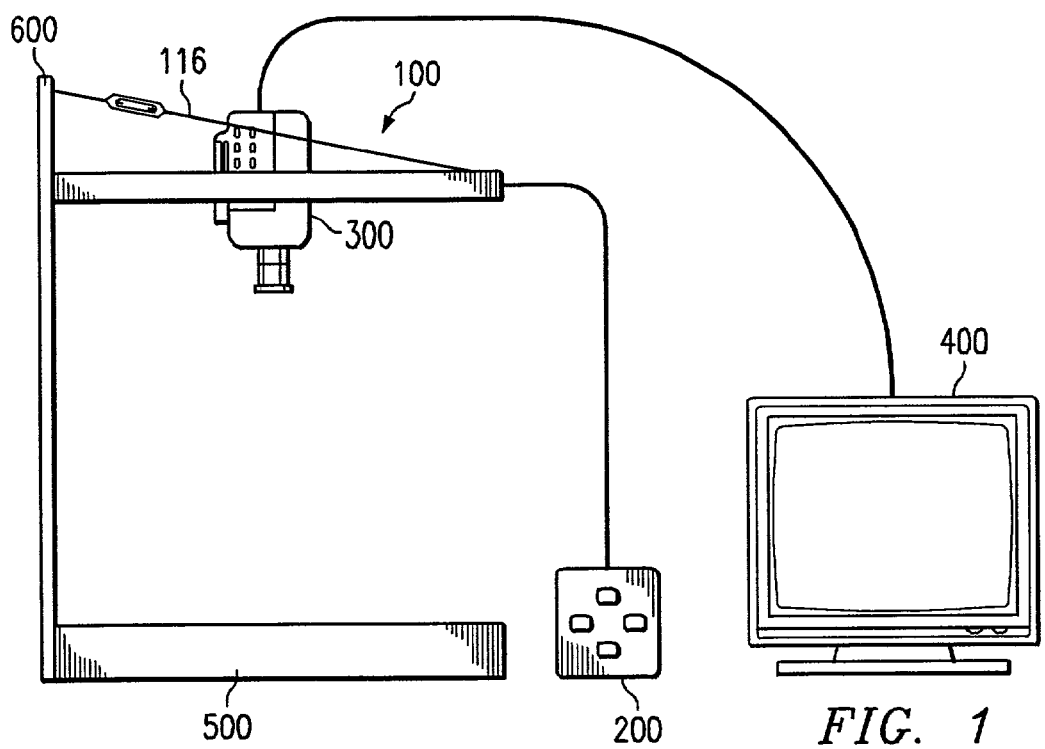
FIG. 1
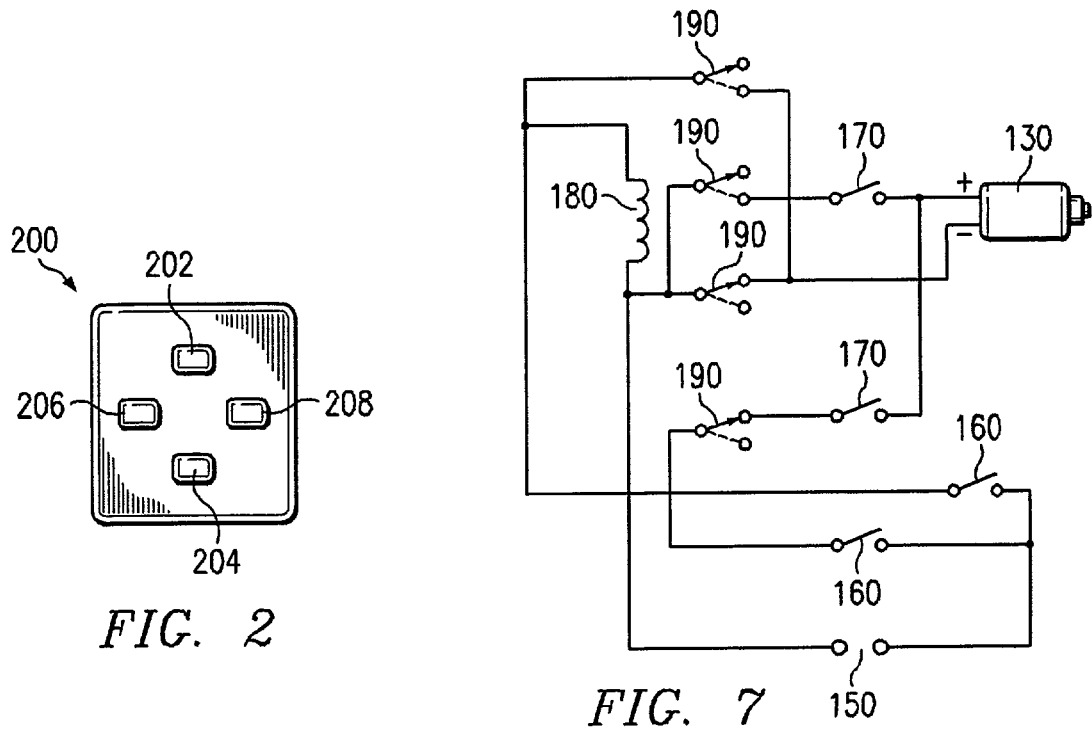
FIG. 2
FIG. 7

X-Y VIDEO CAMERA SUPPORT AND POSITIONING SYSTEM

FIELD OF THE INVENTION

The present invention relates generally to a magnified viewing mechanism and system, more particularly to a mechanism and system for magnifying materials too small for people with poor eyesight to otherwise see.

BACKGROUND OF THE INVENTION

Macular degeneration is the imprecise historical name given to a group of diseases that cause sight-sensing cells in the macular zone of the retina to malfunction or lose function and results in debilitating loss of vital central or detail vision.

The retina contains an extraordinary photosensitive array of cells that line the back of the eye. The light falling onto these cells in the retina is transformed into electrical signals that are transmitted to the brain centers that process and interpret them.

The most concentrated collection of photosensitive cells in the retina, including those that enable critical color and fine detail vision, are found in the Bulls-Eye center zone in an area called the macula.

Macular degeneration can cause different symptoms in different people. Sometimes only one eye loses vision while the other eye continues to see well for many years. The condition may be hardly noticeable in its early stages. But when both eyes are affected, reading and close up work can become difficult.

A case of adult macular degeneration is diagnosed every three minutes in the United States of America. One in six Americans between the ages of 55 and 64 will be affected while one in four Americans between 64 and 74 will be stricken. One in three over the age of 75 will be affected. Each year 1.2 million of the estimated 12 million people with macular degeneration will suffer severe central vision loss. Each year 200,000 individuals will lose all central vision in one or both eyes.

The only proven treatment is laser photocoagulation, but only 10–15% of eyes with wet macular degeneration are treatable with laser. Then recurrences after laser treatment are common (70% in 5 years). The average visual acuity 3 years after treatment is usually 20/200 to 20/250.

Patients rarely lose all of their vision from macular degeneration. Though they have poor central vision, most can walk around, dress themselves, and perform many of their normal daily tasks.

In order to facilitate some of the normal daily tasks of people with macular degeneration, several vision enhancement systems have been developed. These systems usually include some type of a video camera and a monitor. The user moves a book or magazine or picture underneath the camera, and the item shows up on the monitor.

The problem with these systems, however, is that they are prohibitively expensive and hard to maneuver. Some systems have portable headset systems and cost several thousand dollars. Others are very inexpensive, but require the user to move the item of interest underneath the camera, which can be unnatural and hard to learn.

SUMMARY OF THE INVENTION

The present invention addresses the foregoing needs by providing an inexpensive system for vision enhancement that is extremely easy to use. A positioning device receives input from a four button control panel, which allows precise positioning of a video camera above a stage. The images from the video camera are output onto a monitor, where they are displayed. The camera can be moved left, right, up and down over the image, which is very natural and easy to learn. Instead of having to physically move an image under a stationary camera, the user can simply use up, down, left and right buttons to move the camera while the image stays stationary. With long enough cables or a remote control, the user does not have to be near the positioning device, potentially keeping it hidden in a corner of the room.

BRIEF DESCRIPTION OF THE DRAWINGS

FIG. 1 is a diagram of the system, showing the relationship between the control panel, the positioning device, the camera, the stage, and the monitor.

FIG. 2 is a diagram of the control panel.

FIG. 7 is a wiring diagram of a representative switching circuit for the different motors.

DETAILED DESCRIPTION OF PREFERRED EMBODIMENTS

Figure 3:
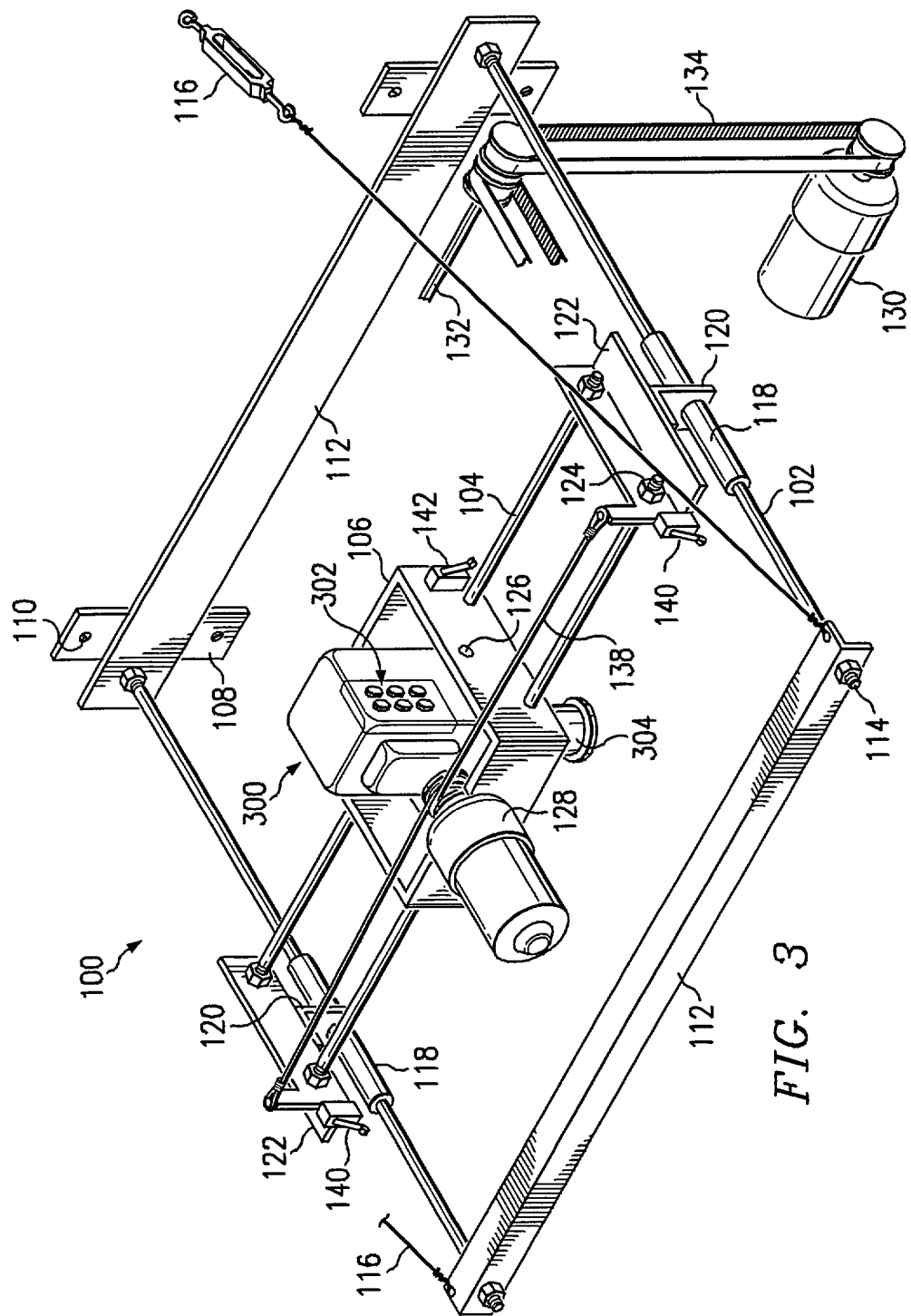
FIG. 3 is a perspective view of the positioning system, showing how the positioning system moves the camera around above the stage.

Referring now to the figures, a preferred embodiment of the system is shown in FIG. 1. FIG. 1 shows an X-Y video camera support and positioning system. The positioning device 100 receives input from a control panel 200, which allows precise positioning of a video camera 300 above a stage 500. Any type of material may be placed on the stage 500, but it is anticipated that items such as drawings, books, newspapers, magazines and pictures will be used most commonly. The images from the video camera 300 are output onto a monitor 400, where they are displayed. Examples of monitors are television sets and computer monitors. Magnification of the image is controlled by the video camera 300, and available magnifications will vary from model to model. In a preferred embodiment, stage 500 and positioning device 100 will be in a self-contained unit, connected by mounting wall 600. Preferably, the mounting wall will have an opening at the bottom so that large items, such as newspapers, will not have to be folded up against the mounting wall in order to be read. Rather, the portion of the page not being read will stick through the opening at the base of the mounting wall.

In a preferred embodiment, the camera 300 is permanently mounted perpendicular to the stage 500, and the positioning device 100 moves the camera in a plane perpendicular to the camera 300 and parallel to the stage 500. In other embodiments, however, the camera 300 may swivel side to side (although this would create a slightly skewed picture).

The control panel 200, illustrated in FIG. 2, contains four buttons, an up button 202, a down button 204, a left button 206 and a right button 208. The user will have to position items in the correct orientation on the stage so that the four buttons correspond to actual up, down, left and right movement. When correctly aligned, the user uses the control buttons to place the video camera over the item on the stage, and views a magnified image on the monitor. For example, to read a book using the system, the user would use the control buttons to find the upper left portion of a page, then pan to the right using the right control button 208, then back to the left and down using the left 206 and down 204 control buttons. The user would repeat this process all the way down the page, and then repeat the whole process for the next page. In another embodiment, rather than utilizing a four button control panel, a joystick would be used.

FIG. 3 illustrates how the positioning device 100 receives instructions from the control panel 200 and maneuvers the camera 300 accordingly. The positioning device contains a first set of parallel rods 102 and a second set of parallel rods 104. These rods are preferably stainless steel and male threaded on their ends. Other possible materials include aluminum, plastic, vinyl, and any other material from which cylindrical rods are made. Stainless steel is preferable because of its uniformity and rigidity. The rods can be of any length, but should be longer than any material anticipated being used on the stage. Preferably the rods are twenty inches in length. The video camera 300 is held inside a carriage 106 by set screws 126. The camera has a control area 302 and a lens 304. The control area 302 has controls for adjusting the magnification and focus. Alternatively, a camera with manual focus and manual zoom may be used.

The carriage lies along the second set of parallel rods 104. The first set of parallel rods 102 are connected at their ends to perimeter plates 112, connected by nuts 114 over the threads of the rods 102. Alternatively, the rods could be welded to the perimeter plates. The perimeter plates 112 are preferably constructed of aluminum, but may alternatively be constructed of any metal or plastic strong enough to keep the positioning device 100 rigid. The positioning device 100 may be connected to mounting wall 600 by wall connector plates 108 and turnbuckles 116. The mounting wall 600 can be any material, but preferably is matched to the surrounding furniture of the user's living area. The wall connector plates 108 attach to the mounting wall by screws 110. Other items instead of screws may be used, however, such as nails or lag screws. For most of the connections on the positioning device, screws and bolts are preferable to more permanent connections such as welds. The reason for this is that screws and bolts give the user of the positioning device a much higher degree of control over the system, allowing the user to easily fix any problems with carriage movement caused by rods no longer being parallel, one rod being slightly higher than another, etc.

Figure 4:
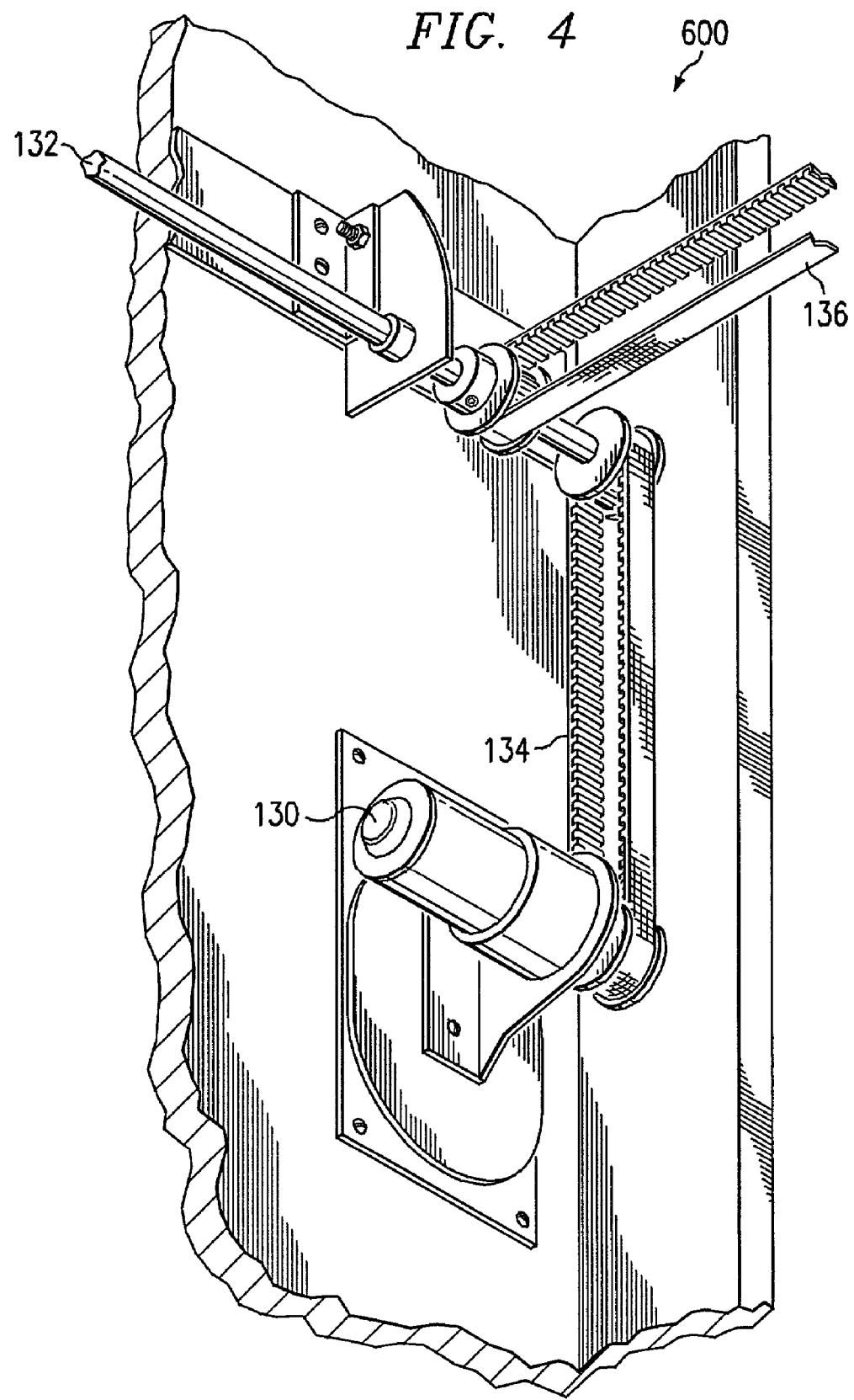
FIG. 4 is a perspective view of the first motor and associated belts, showing how the motor makes the belts and turning rod rotate.
Figure 5:
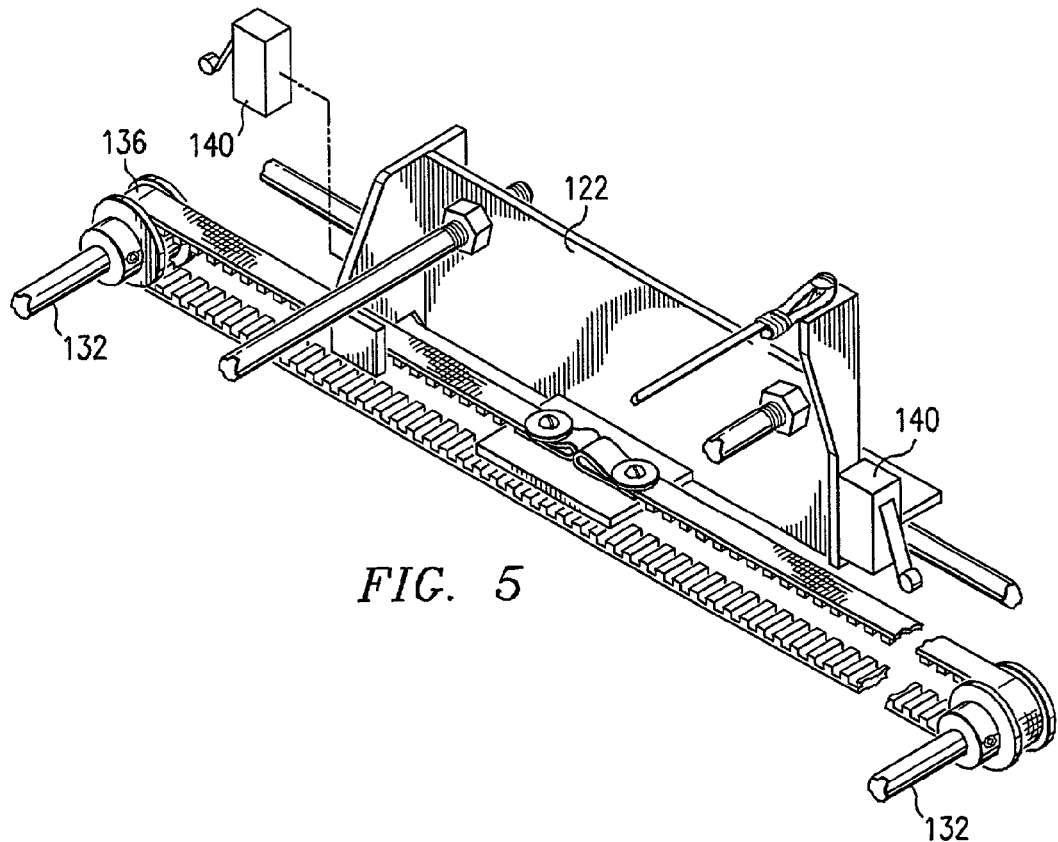
FIG. 5 is a perspective view of the belt system, showing how the second belts are connected to the turning rods and mounting plates.
Figure 6:
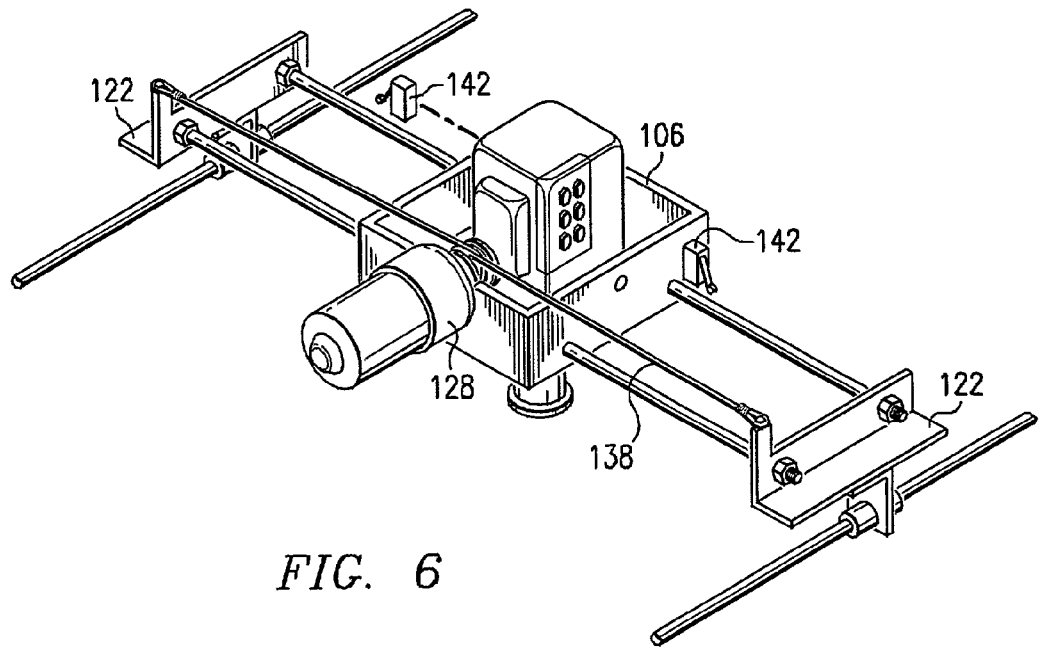
FIG. 6 is a perspective view of the rubber belt system, showing how the rubber belt is connected to the second motor and the mounting plates.

FIGS. 4–6 illustrate the motor and belt system. The carriage 106 can move in four directions through the use of a first motor 130 and a second motor 128. The first motor 130, attached to the mounting wall 600, controls the motion of bushings 118 along the first set of parallel rods 102. Preferably the motor 130 is attached to the mounting wall 600 with a silicone material, so as to minimize the amount of motor noise transmitted to the mounting wall. In a preferred embodiment, the motor is coupled to a turning rod 132 by a first timing belt 134. Two second timing belts 136 span the distance between turning rod 132 and perimeter plate 112. The second timing belts 136 are attached to mounting plates 122. As the first motor 130 runs, the second timing belts 136 move on an elliptical path, in turn making mounting plates 122 and bushings 118 travel between the two perimeter plates 112. Limit switches 140, attached to the mounting plates 122, stop the motor 130 when the limit switches make contact with the perimeter plate 112. The second motor 128 is attached to the carriage 106 and controls the position of the carriage along the second set of parallel rods 104. In a preferred embodiment, a rubber belt 138 is attached to both mounting plates, and wrapped around motor 128. As second motor 128 operates, the carriage moves along the path of the rubber belt 138. Limit switches 142, attached to the carriage 106, stop the motor 128 when the limit switches 142 make contact with the mounting plates 122.

The first motor 130 can be connected to the bushings in a number of ways, including a chain pulley system or a rubber cog system between perimeter plates 112. Similarly, the second motor 128 can use a chain pulley system or a rubber cog system to move the carriage 106 between mounting plates 122.

The first set of rods 102 is connected to the second set of rods 104 by mounting plates 122 and the bushings 118. The bushings slide back and forth along the first set of rods 102, controlled by the first motor 130, which itself is controlled by the up 202 and down 204 buttons of the control panel 200. The bushings 118 preferably have an inner diameter at least ⅛" larger than the outer diameter of rods 102. This is so there is less friction between bushings 118 and rods 102. The bushings 118 can be connected to the mounting plates 122 in any number of ways, including gluing and welding. The ends of the second set of rods 104 are connected to the mounting plates 122 by nuts 124 over the threads of the rods 104. Alternatively, the rods could be permanently welded to the mounting plates.

While the preferred embodiment uses tracks comprised of parallel rods, similar tracks may be used as well. For example, instead of bushings on a rod, wheels on a track could be used. Alternatively, an electromagnetic track could be used. For some different types of tracks, such as an electro-magnetic track, parallel tracks would not be necessary. There could be two single tracks, with the video camera mounted below the two tracks.

The motors 128, 130 can be connected to the control panel 200 by wires, or alternatively by RF signal or infrared. Any number of wires are acceptable, including, but not limited to, category 5 cables, coaxial cables, IEEE 1394 "fire wire", standard 4 or 6 wire cable, telephone cables.

The video camera 300 can be connected to the monitor 400 through any of the commercially available cables for audio/visual (A/V) connections, or again by infrared or RF signal.

FIG. 7 shows the wiring diagram of the motors 128, 130. Power comes from terminals 150. Directional switches 160 determine whether the motor runs forward or in reverse. Electrical Limit switches 170, electronically coupled to limit switches 140 and 142, stop the motor when the limit switch 142 contacts either of the mounting plates 122 (for motor 128), or when limit switch 140 contacts either of the perimeter plates 112 (for motor 130). Inductor 180 controls the four switches 190, which start the motor. All four switches 190 are switched in unison. FIG. 7 shows the wiring diagram for only motor 130, but the wiring diagram for motor 128 is identical.

Although the present invention has thus been described in detail with regard to certain preferred embodiments, it should be apparent to those skilled in the art that various adaptations and modifications of the present invention may be accomplished without departing from the spirit and the scope of the invention. Accordingly, the present invention is not limited to the specific embodiments illustrated herein. Those skilled in the art will understand that the detailed description as set forth above is not intended to limit the breadth of the present invention, which is instead defined by the appended claims and their appropriately construed legal equivalents.

What is claimed is:

1. A system for enlarging images, comprising:
a positioning device, the positioning device comprising:
 a first set of parallel rods, wherein the first set of parallel rods contains left and right ends,
 a second set of parallel rods, movably mounted perpendicular to the first set of parallel rods, wherein the second set of parallel rods contains top and bottom ends;
 a carriage mounted for movement along the second set of parallel rods;
 a first motor coupled to move the second set of parallel rods along the first set of parallel rods;
 a second motor coupled to move the carriage along the second set of parallel rods, wherein the control panel actuates the first and second motors;
a control panel coupled to move the positioning device, wherein the control panel includes a left control button, a right control button, an up control button, a down control button, and a joystick;
a video camera, coupled to the positioning device, which provides a video output;
a monitor, connected to the video camera, which displays the video output;
a stage, on which material of any type may be placed, wherein the video camera films the material, and the monitor displays the material at a high magnification;
a first perimeter plate, perpendicular to the first set of parallel rods, connected to the left ends of the first set of parallel rods;
a second perimeter plate, perpendicular to the first set of parallel rods, connected to the right ends of the first set of parallel rods;
a first mounting plate, perpendicular to the second set of parallel rods, connected to the top ends of the second set of parallel rods;
a second mounting plate, perpendicular to the second set of parallel rods, connected to the bottom ends of the second set of parallel rods;
bushings attached to the two mounting plates, wherein the bushings slide over the first set of parallel rods, allowing the second set of parallel rods to travel along the first set of parallel rods between the two perimeter plates; and
a mounting wall and a set of wall mounting plates connected to the first set of parallel rods, to allow mounting of the positioning device to the mounting wall.

2. The system of claim 1, wherein the mounting wall is perpendicular to both the stage and to positioning device, wherein the mounting wall contains an opening at its base, wherein the positioning device is above the stage.

3. The system of claim 1, wherein the first motor is attached to the mounting wall and the second motor is attached to the carriage.

4. The system of claim 1, wherein the first motor is coupled to the mounting plates by a chain pulley.

5. The system of claim 1, wherein the first motor is coupled to the mounting plates by a first chain pulley, a second chain pulley, and a turning rod.

6. The system of claim 1, wherein the second motor is coupled to the carriage by a chain pulley.

7. The system of claim 1, wherein the first motor is coupled to the mounting plates by a rubber cog belt.

8. The system of claim 1, wherein the first motor is coupled to the mounting plates by a first rubber cog belt, a second rubber cog belt, and a turning rod.

9. The system of claim 1, wherein the second motor is coupled to the carriage by a rubber cog belt.

10. The system of claim 1, further comprising a set of two turnbuckles, connected to the wall plate on a right end and to the first perimeter plate on a left end.

11. The system of claim 1, further comprising perimeter plate nuts, wherein the left and right ends of the first set of parallel rods have a diameter and are threaded, the first and second perimeter plates contain two holes with a diameter slightly larger than the diameter of the ends of the rods, wherein the first set of parallel rods are connected to the perimeter plates by nuts over the threaded ends.

12. The system of claim 1, further comprising mounting plate nuts, wherein the top and bottom ends of the second set of parallel rods have a diameter and are threaded, the first and second mounting plates contain two holes with a diameter slightly larger than the diameter of the ends of the rods, wherein the second set of parallel rods are connected to the perimeter plates by nuts over the threaded ends.

13. The system of claim 1, wherein the control panel is coupled to the first and second motors by 6 wire cable.

14. The system of claim 1, wherein the control panel is coupled to the first and second motors by infrared connection.

15. The system of claim 1, wherein the control panel is coupled to the first and second motors by RF signal.

16. The system of claim 1, wherein the video camera is connected to the monitor by wire cable.

17. The system of claim 1, wherein the video camera is connected to the monitor by infrared connection.

18. The system of claim 1, wherein the video camera is connected to the monitor by RF signal.

19. The system of claim 1, wherein the up control button moves the mounting plates in a direction towards the right ends of the first set of parallel rods.

20. The system of claim 1, wherein the down control button moves the mounting plates in a direction towards the left ends of the first set of parallel rods.

21. The system of claim 1, wherein the left control button moves the carriage in a direction towards the up ends of the second set of parallel rods.

22. The system of claim 1, wherein the right control button moves the carriage in a direction towards the down ends of the second set of parallel rods.

23. The system of claim 1, further comprising limit switches, attached to both the carriage and the mounting plates, wherein the limit switches constrain the motion of the carriage within the boundaries of the perimeter plates and the mounting plates.

24. The system of claim 23, wherein the limit switches are coupled to the control panel buttons.

* * * * *